(12) United States Patent
Koch

(10) Patent No.: US 12,359,767 B2
(45) Date of Patent: Jul. 15, 2025

(54) COMPRESSED GAS TANK OR CYLINDER ROTATING CLEAN-OUT APPARATUSES AND METHODS OF USING THE SAME

(71) Applicant: Calypso Enterprises, LLC, Crystal Lake, IL (US)

(72) Inventor: Arthur Koch, Crystal Lake, IL (US)

( * ) Notice: Subject to any disclaimer, the term of this patent is extended or adjusted under 35 U.S.C. 154(b) by 0 days.

(21) Appl. No.: 18/123,713

(22) Filed: Mar. 20, 2023

(65) Prior Publication Data
US 2023/0296203 A1    Sep. 21, 2023

Related U.S. Application Data

(60) Provisional application No. 63/321,406, filed on Mar. 18, 2022.

(51) Int. Cl.
| *F16M 11/10* | (2006.01) |
| *B08B 9/08* | (2006.01) |
| *F16M 11/04* | (2006.01) |

(52) U.S. Cl.
CPC ........... *F16M 11/10* (2013.01); *B08B 9/0821* (2013.01); *F16M 11/046* (2013.01); *F16M 2200/041* (2013.01)

(58) Field of Classification Search
CPC .................. F16M 11/10; F16M 11/046; F16M 2200/041; B08B 9/0821
USPC .......................................................... 248/371
See application file for complete search history.

(56) References Cited

U.S. PATENT DOCUMENTS

| 3,490,727 A * | 1/1970 | Miller ................... A62C 15/00 211/101 |
| 3,667,714 A * | 6/1972 | Ziaylek .................. A62C 13/78 248/586 |
| 3,780,972 A * | 12/1973 | Brodersen .............. A62C 13/78 211/85.18 |
| 4,021,070 A * | 5/1977 | Shea ....................... B66F 19/00 414/547 |
| 4,056,017 A * | 11/1977 | Cobb ........................ A62B 9/04 414/743 |
| 4,059,281 A * | 11/1977 | Evans ..................... B60K 15/07 180/69.2 |
| 4,556,358 A * | 12/1985 | Harlan .................... B66C 23/36 212/238 |
| 5,769,375 A * | 6/1998 | Welker ................. F16M 11/105 248/231.71 |
| 5,799,849 A * | 9/1998 | Beer ........................ B60R 11/00 224/403 |
| 6,086,312 A * | 7/2000 | Ziaylek .................... B60P 7/12 414/917 |

(Continued)

FOREIGN PATENT DOCUMENTS

CN            212890475 U  *  4/2021

*Primary Examiner* — Monica E Millner
(74) *Attorney, Agent, or Firm* — Scherrer Patent & Trademark Law, P.C.; Stephen T. Scherrer; Monique A. Morneault

(57) ABSTRACT

A compressed gas tank or cylinder rotating clean-out apparatus comprises a rotating apparatus for clamping and rotating a compressed gas tank or cylinder for aiding in clean-out of the same. More specifically, the apparatus comprises a platform and strap for holding a compressed gas tank or cylinder, such as a SCUBA tank, and providing for the rotating of the same to dispose in various rotated positions so that the same may be more easily cleaned. Systems and methods for using the same are further provided.

20 Claims, 4 Drawing Sheets

(56) References Cited

U.S. PATENT DOCUMENTS

| | | | | |
|---|---|---|---|---|
| 7,503,535 | B2 * | 3/2009 | Ziaylek | A62B 9/04 |
| | | | | 348/505 |
| 7,621,565 | B2 * | 11/2009 | Ross, Jr. | B60K 15/07 |
| | | | | 280/830 |
| 8,382,419 | B2 * | 2/2013 | Agoncillo | B66F 9/18 |
| | | | | 414/910 |
| 8,469,247 | B2 * | 6/2013 | Nicoletti | A62B 25/00 |
| | | | | 224/403 |
| 8,622,469 | B2 * | 1/2014 | Hogg | B60R 11/00 |
| | | | | 248/316.5 |
| 9,388,029 | B2 * | 7/2016 | Ziaylek | B65G 7/00 |
| 9,764,171 | B2 * | 9/2017 | Ziaylek | A62B 25/00 |
| 10,682,537 | B2 * | 6/2020 | Lackore, Jr. | B62D 33/06 |

* cited by examiner

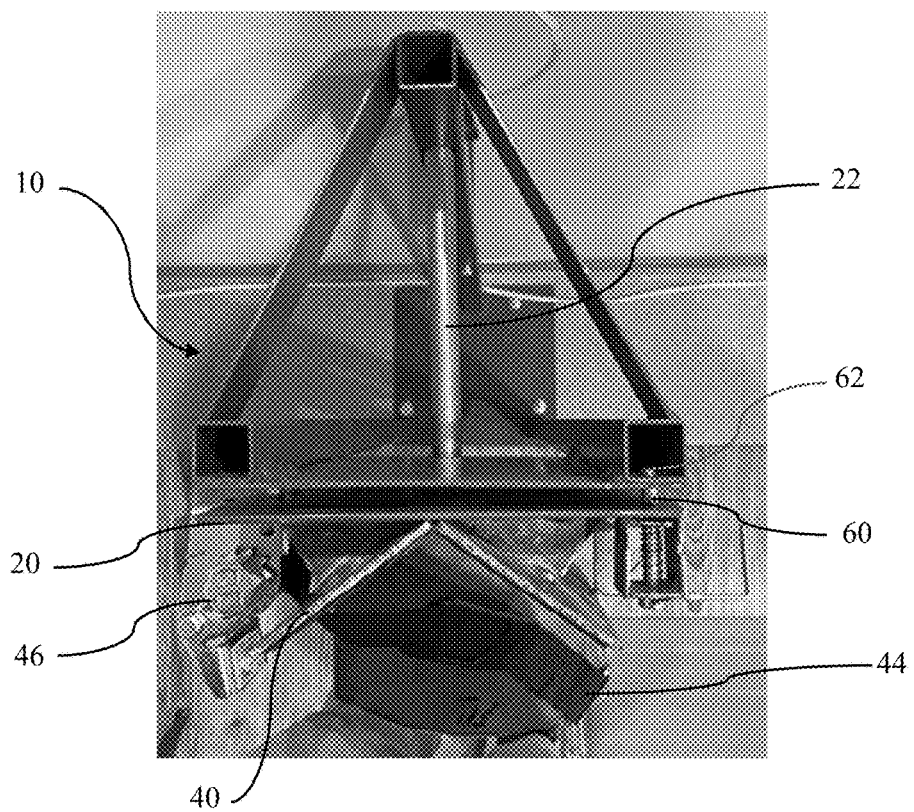
FIG. 2
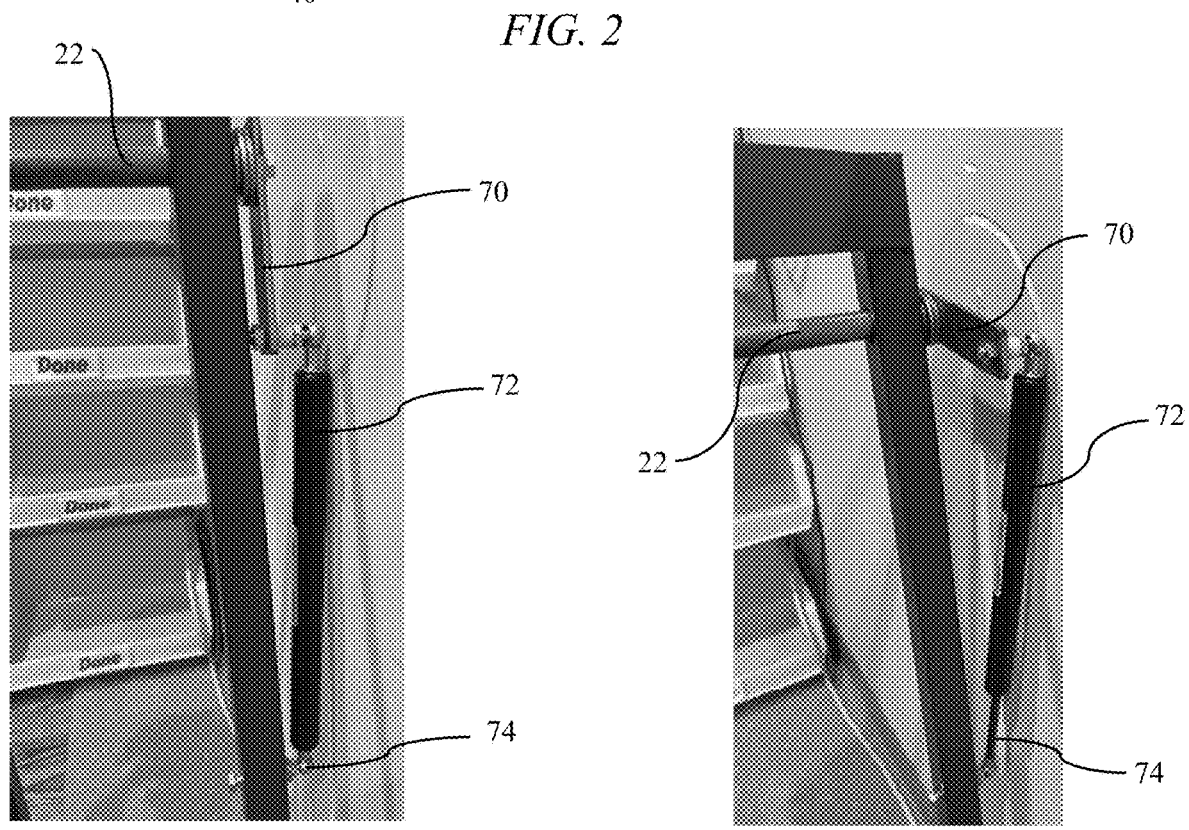
FIG. 3A
FIG. 3B

COMPRESSED GAS TANK OR CYLINDER ROTATING CLEAN-OUT APPARATUSES AND METHODS OF USING THE SAME

CROSS-REFERENCE TO RELATED APPLICATIONS

The present invention claims priority to U.S. Prov. Pat. App. No. 63/321,406, titled "Compressed Gast Tank or Cylinder Rotating Clean-Out Apparatus," filed on Mar. 18, 2022, which is incorporated herein by reference in its entirety.

TECHNICAL FIELD

The present invention relates to a compressed gas tank or cylinder rotating clean-out apparatus. Specifically, the apparatus comprises a rotating apparatus for clamping and rotating a compressed gas tank or cylinder for aiding in clean-out of the same. More specifically, the apparatus comprises a platform and strap for holding a compressed gas tank or cylinder, such as a SCUBA tank, and providing for the rotating of the same to dispose in various rotated positions so that the same may be more easily cleaned. Systems and methods for using the same are further provided.

BACKGROUND

Compressed gas tanks or cylinders must be opened, emptied, and cleaned periodically. For example, SCUBA tanks containing compressed breathable air are required to be opened, emptied, and cleaned on a regular basis to ensure that the compressed air is breathable without contaminants or other like materials that may be dangerous to users thereof, especially under water during use.

Compressed gas tanks or cylinders are often difficult to open, empty, and clean as the tanks tend to be heavy and cumbersome. Past solutions typically involve simply removing the valve at the tank opening and manually holding the tank upside-down to empty the same. The tanks are then cleaned out using mild detergents or other like cleaning solutions and then rinsed using water. A need, therefore, exists for an improved compressed gas tank or cylinder apparatus that aids in emptying and cleaning the same. Specifically, a need exists for an improved compressed gas tank or cylinder apparatus that rotates to invert the compressed gas tank or cylinder.

Other solutions utilize apparatuses that aid in inverting gas cylinders to allow for emptying of contents but these apparatuses tend to be large and have space constraints. In addition, often the prior solutions do not allow for control of the rotation of the compressed gas tank or cylinder, providing stops for inversions of the same in different positions. Therefore, a need exists for an improved compressed gas tank or cylinder apparatus that has a relatively small footprint and can be incorporated into relatively small spaces. Moreover, a need exists for an improved gas tank or cylinder apparatus that provides discrete stopping positions for the inversion of the compressed gas tank or cylinder thereby aiding a user in emptying and cleaning the same.

In addition, because compressed gas tanks or cylinders are typically large, heavy, and often cumbersome, rotation of the same about an axis may be difficult to control. As the compressed gas tank or cylinder rotates, the weight of the same may cause an increase in angular velocity as it spins, making it difficult to stop and control by a user thereof. A need, therefore, exists for an improved compressed gas tank or cylinder apparatus that is easy to control the rotation thereof. More specifically, a need exists for an improved gas tank or cylinder apparatus that incorporates a rotational dampener to control the rotation thereof when in use.

SUMMARY OF THE INVENTION

The present invention relates to a compressed gas tank or cylinder rotating clean-out apparatus. Specifically, the apparatus comprises a rotating apparatus for clamping and rotating a compressed gas tank or cylinder for aiding in clean-out of the same. More specifically, the apparatus comprises a platform and strap for holding a compressed gas tank or cylinder, such as a SCUBA tank, and providing for the rotating of the same to dispose in various rotated positions so that the same may be more easily cleaned. Systems and methods for using the same are further provided.

To this end, in an embodiment of the present invention, a compressed gas tank rotating apparatus is provided. The compressed gas tank rotating apparatus comprises a base; a rotating plate attached to an axle extending through the base; and a holding bracket and a securing strap on the rotating plate configured to securely hold a compressed gas tank on the holding bracket, wherein when a gas tank is disposed on the holding bracket and secured via the securing strap it is configured to be disposed between an upside-down configuration and a right-side-up configuration via rotation of the rotating plate, wherein the axle is attached to a rotating arm that is further connected to a rod extending from a cylinder tube of a pneumatic or hydraulic cylinder, wherein rotation of the rotating plate causes the rotating arm to rotate and the rod to extend from or retract into the cylinder tube of the hydraulic or pneumatic cylinder, wherein when the compressed gas tank is rotated from the upside-down configuration to the right-side up configuration, the rod retracts into the cylinder tube of the hydraulic or pneumatic cylinder thereby dampening the speed of rotation of the rotating plate and the compressed gas tank.

In an embodiment, the base is configured to be securely held to a floor.

In an embodiment, the pneumatic or hydraulic cylinder is fixed to the base on an end of the cylinder tube opposite an end where the rod extends from or retracts into the cylinder tube.

In an embodiment, the pneumatic or hydraulic cylinder is rotatably fixed to a point on the base at the end of the cylinder tube opposite the end where the rod extends from or retracts into the cylinder tube such that when the rotating arm rotates, the pneumatic or hydraulic cylinder swivels about the point on the base.

In an embodiment, the holding bracket comprises a V-shaped body that is configured to hold a compressed gas tank adjacent the V-shaped body.

In an embodiment, the holding bracket comprises an elastomeric material on a surface that is configured to contact the compressed gas tank.

In an embodiment, the securing strap is a ratcheting strap.

In an embodiment, the compressed gas tank rotating apparatus further comprises a shelf disposed adjacent the rotating plate, the shelf configured to hold a bottom of the compressed gas tank or cylinder.

In an embodiment, at least one leg extends from the rotating plate wherein the shelf is attached to the at least one leg wherein a vertical position of the shelf is adjustable along the at least one leg.

In an embodiment, a locking pin is configured to engage the rotating plate or the axle for locking the position of the rotating pin or axle in at least one rotational position.

In an alternate embodiment of the present invention, a method of using a compressed gas tank rotating apparatus is provided. The method comprises the steps of: providing a compressed gas tank rotating apparatus comprising a base, a rotating plate attached to an axle extending through the base, a holding bracket and a securing strap on the rotating plate configured to securely hold a compressed gas tank on the holding bracket wherein when a gas tank is disposed on the holding bracket and secured via the securing strap it is configured to be disposed between an upside-down configuration and a right-side-up configuration via rotation of the rotating plate, wherein the axle is attached to a rotating arm that is further connected to a rod extending from a cylinder tube of a pneumatic or hydraulic cylinder, wherein rotation of the rotating plate causes the rotating arm to rotate and the rod to extend from or retract into the cylinder tube of the hydraulic or pneumatic cylinder; securely holding the compressed gas tank on the holding bracket with the securing strap so that the compressed gas tank is in a vertical position; rotating the compressed gas tank to a position other than the vertical position; and rotating the compressed gas tank back to the vertical position and causing the rod to retract into the cylinder tube of the pneumatic or hydraulic cylinder thereby dampening the speed of rotation of the rotating plate and the compressed gas tank.

In an embodiment, the method further comprises the step of securely fastening the based to a floor.

In an embodiment, the pneumatic or hydraulic cylinder is fixed to the base on an end of the cylinder tube opposite an end where the rod extends from or retracts into the cylinder tube.

In an embodiment, the pneumatic or hydraulic cylinder is rotatably fixed to a point on the base at the end of the cylinder tube opposite the end where the rod extends from or retracts into the cylinder tube such that when the rotating arm rotates, the hydraulic or pneumatic cylinder swivels about the point on the base.

In an embodiment, the holding bracket comprises a V-shaped body and the method further comprises the step of holding the compressed gas tank adjacent the V-shaped body.

In an embodiment, the holding bracket comprises an elastomeric material on a surface that is configured to contact the compressed gas tank, the method further comprising the step of contacting the compressed gas tank to the elastomeric material.

In an embodiment, the securing strap is a ratcheting strap and the method further comprises the step of securely holding the compressed gas tank on the holding bracket via the ratcheting strap.

In an embodiment, the compressed gas tank rotating apparatus further comprises a shelf disposed adjacent the rotating plate and the method further comprising the step of holding a bottom of the compressed gas tank or cylinder on the shelf.

In an embodiment, compressed gas tank rotating apparatus further comprises at least one leg extending from the rotating plate wherein the shelf is attached to the at least one leg wherein a position of the shelf is adjustable along a length of the at least one leg wherein adjusting the shelf along the length of the at least one leg causes the shelf to move toward or away from the rotating plate, and further comprises the step of: adjusting the shelf along the length of the at least one leg to move the shelf toward or away from the rotating plate.

In an embodiment, the method further comprises the steps of: providing a locking pin configured to engage the rotating plate or the axle for locking the position of the rotating pin or axle in at least one rotational position; rotating the rotating plate to a rotational position; and locking the rotating plate to the rotational position.

It is, therefore, an advantage and objective of the present invention to provide an improved compressed gas tank or cylinder apparatus that aids in emptying and cleaning the same.

Specifically, it is an advantage and objective of the present invention to provide an improved compressed gas tank or cylinder apparatus that rotates to invert the compressed gas tank or cylinder.

In addition, it is an advantage and objective of the present invention to provide an improved compressed gas tank or cylinder apparatus that has a relatively small footprint and can be incorporated into relatively small spaces.

Moreover, it is an advantage and objective of the present invention to provide an improved gas tank or cylinder apparatus that provides discrete stopping positions for the inversion of the compressed gas tank or cylinder thereby aiding a user in emptying and cleaning the same.

Further, it is an advantage and objective of the present invention to provide an improved compressed gas tank or cylinder apparatus that is easy to control the rotation thereof.

Still further, it is an advantage and objective of the present invention to provide an improved gas tank or cylinder apparatus that incorporates a rotational dampener to control the rotation thereof when in use.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 illustrates a top view of a compressed gas tank or cylinder rotating apparatus in an embodiment of the present invention.

FIGS. 3A-3B illustrate a rotation dampening element on a compressed gas tank or cylinder rotating apparatus in an embodiment of the present invention.

DETAILED DESCRIPTION OF THE PRESENTLY PREFERRED EMBODIMENTS

The present invention relates to a compressed gas tank or cylinder rotating clean-out apparatus. Specifically, the apparatus comprises a rotating apparatus for clamping and rotating a compressed gas tank or cylinder for aiding in clean-out of the same. More specifically, the apparatus comprises a platform and strap for holding a compressed gas tank or cylinder, such as a SCUBA tank, and providing for the rotating of the same to dispose in various rotated positions so that the same may be more easily cleaned. Systems and methods for using the same are further provided.

Figure 1:
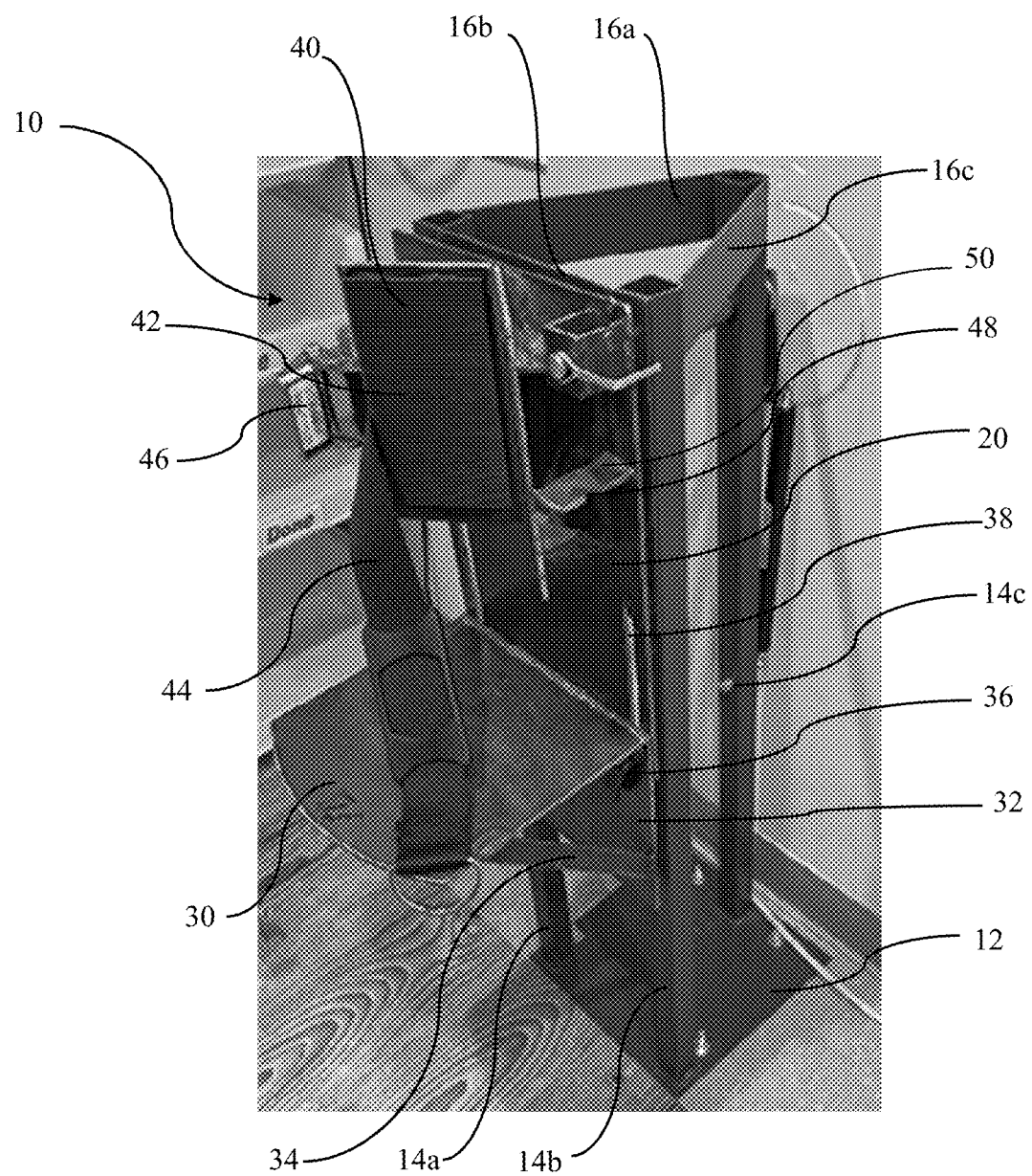
FIG. 1 illustrates a perspective view of a compressed gas tank or cylinder rotating apparatus in an embodiment of the present invention.

Now referring to the drawings, FIG. 1 illustrates a compressed gas tank or cylinder rotating apparatus 10 in an embodiment of the present invention. The apparatus 10 may comprise a base plate 12 and one or a plurality of legs 14a, 14b, 14c, which may be, in the embodiment shown in FIG. 1, arranged in a triangular configuration, when viewed from above as illustrated in FIG. 2, and securing straps 16a, 16b, 16c that rigidly hold the legs 14a, 14b, and 14c in position. The legs are formed from steel bars or tubes and provide enough strength and rigidity to hold a compressed gas tank or cylinder on the apparatus, as described in more detail below. It should be noted that the base plate and one or more legs may be arranged in any configuration to provide rigidity and strength for holding a gas tank or gas cylinder thereon, as described in more detail below.

A rotating plate 20 may be attached to an axle 22 that may extend through the back leg 14c and the front securing strap 16b, which may hold the axle 22 in place. The rotating plate 20 may be attached to a front terminal end of the axle 22 and may freely rotate via the axle 22.

Disposed on a bottom of the rotating plate 20 may be a platform 30 that may preferably be adjustable vertically, thereby allowing for the use of the same with different sized compressed gas tanks or cylinders. It should be noted, however, that the platform 30 may be rigidly and permanently held to the rotating plate 20, such as via welding or other like adhesion.

As noted, preferably, the platform 30 may be adjusted vertically. Specifically, the platform 30 may comprise a vertical plate 32 or vertical legs extending downwardly on a back edge of the platform 30 and, optionally, one or more angled support struts 34 may be connected between the platform 30 and the vertical plate 32 providing support, especially to hold the weight of a compressed gas tank or cylinder on the platform 30. One or more of pegs or bolts 36 may extend through the vertical plate 32 and engage respective vertical holes or slots 38 within the rotating platform 20 or, alternately, within the vertical plate 32 or legs, allowing the platform to adjust upwardly or downwardly as needed. Tighteners on the pegs or bolts 36 may tighten down on the vertical plate 32 holding the vertical plate 32 and therefore the platform 30 in its desired position. Alternatively, the pegs or bolts 36 may be spring-loaded and easily removed and engaged, as needed.

Attached to the rotating plate 20 may be a V-shaped holding bracket 40 that may hold a compressed gas tank or cylinder 80, as illustrated in FIGS. 4A-4H. The V-shaped holding bracket 40 may have an elastomeric coating or one or more pads 42 on an inside surface thereof which may gently cradle the compressed gas tank or cylinder 80 thereon and prevent scratching of the same.

A strap 44 may extend from one side of the rotating plate 20 to the opposite side thereof and may be held in a notch 48 within a strap holding plate 50 for holding the compressed gas tank or cylinder onto the V-shaped holding bracket 40. The strap 44 may have a ratchet element 46 allowing the strap 44 to securely fasten and hold the compressed gas tank or cylinder in place when the opposite end of the strap 44 is secured to the notch 48.

A spring-loaded pin 60 may be disposed through the plate 20 and may engage one of several apertures 62 within the legs 14a, 14b or other elements that may be disposed thereon. Therefore, the rotating plate 20 may be held in various rotated positions as the spring-loaded pin 60 engages the apertures that are in different positions. Alternatively, the spring-loaded pin may be in other locations, such as disposed in engagement with the axle 22, so as to provide the same or similar functionality. Thus, the rotating plate 20 and, therefore, the compressed gas tank or cylinder, may be securely held at the various rotated positions. For example, the compressed gas tank or cylinder may be held in a horizontal position, or nearly horizontal position. Alternatively, the compressed gas tank or cylinder may be held vertically or nearly vertically upside down. This may be useful for cleaning material from the compressed gas tank or cylinder during a cleaning process.

The axle 22 may extend through the back leg 14c and may be attached to a rotating arm 70 which may, in turn, be connected to one end of a hydraulic or pneumatic cylinder 72. The opposite end of the cylinder 72 (specifically, a rod 74 within the cylinder) may be attached to the back leg 14c, as illustrated in FIGS. 3A, 3B. FIG. 3A illustrates the axle 22, rotating arm 70, and cylinder 72 in a resting or initial position, which is preferably when the rotating plate 30 is configured to hold a compressed gas tank or cylinder vertically right side up (not shown). As the plate 30 rotates, in turn rotating the axle 22 and, therefore, the rotating arm 70, the rod 74 within the cylinder may extend.

As the rotating plate 20 rotates to 180 degrees, which may occur when the compressed gas tank or cylinder is upside down, the rod may be at its fullest extension from within the cylinder 72. As the rotating plate 20 rotates past 180 degrees towards 360 degrees, the rod 74 may contract within the cylinder 72, which may dampen the rotation of the plate 20 due to the presence of water (in the case of a hydraulic cylinder) or air (in the case of a pneumatic cylinder). Therefore, the rotation of the plate 20 and, thus, the compressed gas tank or cylinder may be controlled and slowed until the rotating plate 20 is back in its initial position, thereby providing safety for users thereof.

Figure 4A:
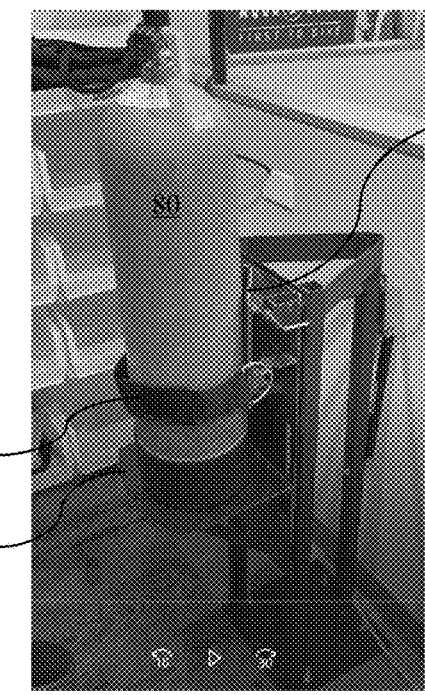
FIGS. 4A-4H illustrate a method of using a compressed gas tank or cylinder rotating apparatus in an embodiment of the present invention.
Figure 4B:
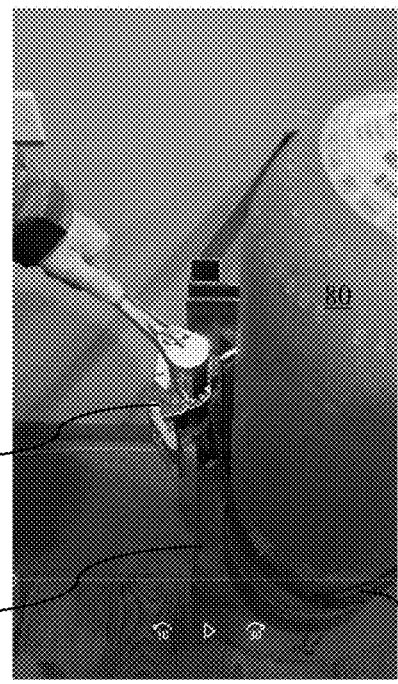
Figure 4C:
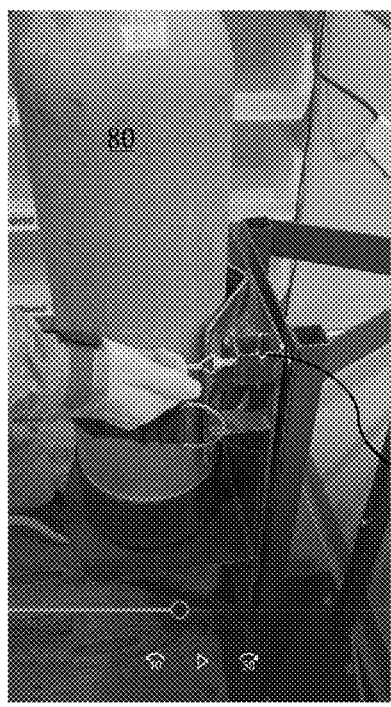

A method of using the compressed gas tank or cylinder rotation apparatus 10 is illustrated in FIGS. 4A-4H in an exemplary embodiment of the present invention. Specifically, in FIG. 4A, a compressed gas tank or cylinder, such as, for example, a SCUBA tank 80, may be positioned on the platform 30 and held on the V-shaped bracket 40. The strap 44 may extend from the one side of the plate 30 and held in the notch 48. As illustrated in FIG. 4B, the ratchet 46 may be tightened, thereby rigidly holding the tank 80 on the platform 30.

Figure 4D:
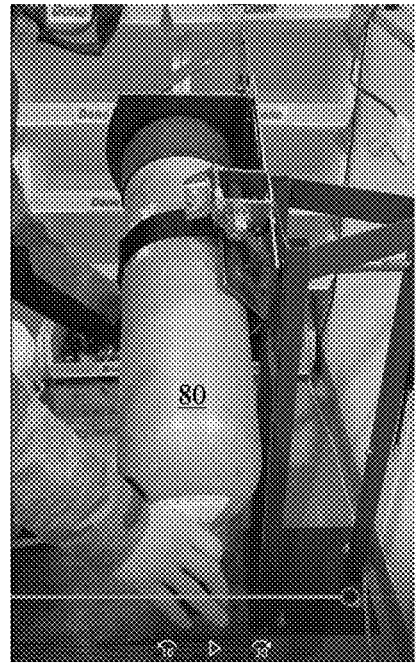

Once secured, the spring-loaded pin 60 may disengage the rotating plate 20 and allow the rotating plate 20 to rotate, as shown in FIG. 4D. Thus, the compressed gas tank or cylinder 80 may be rotated to any position between 0 degrees (its initial position) to 360 degrees (fully rotated). The spring-loaded pin 60 may engage various apertures thereby holding the rotating plate 20 in various positions as desired.

Figure 4E:
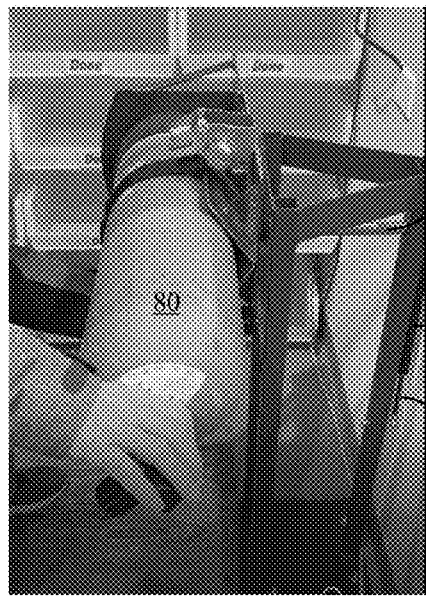
Figure 4F:
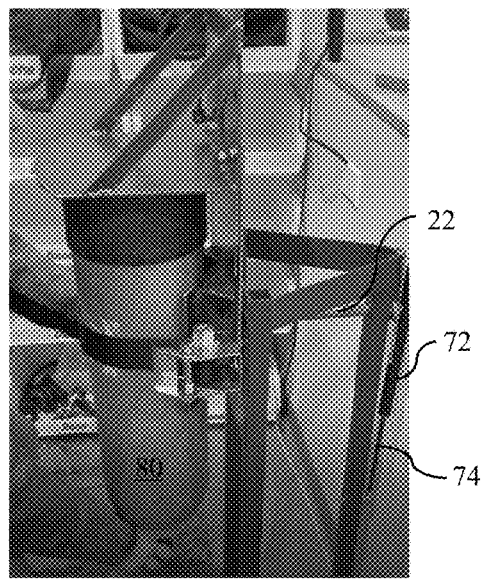
Figure 4G:
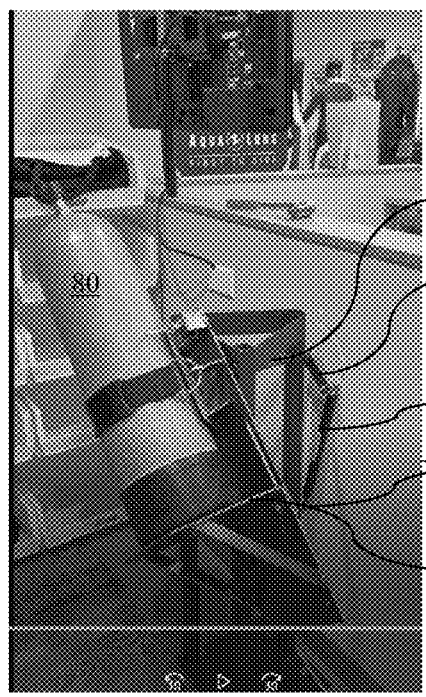
Figure 4H:
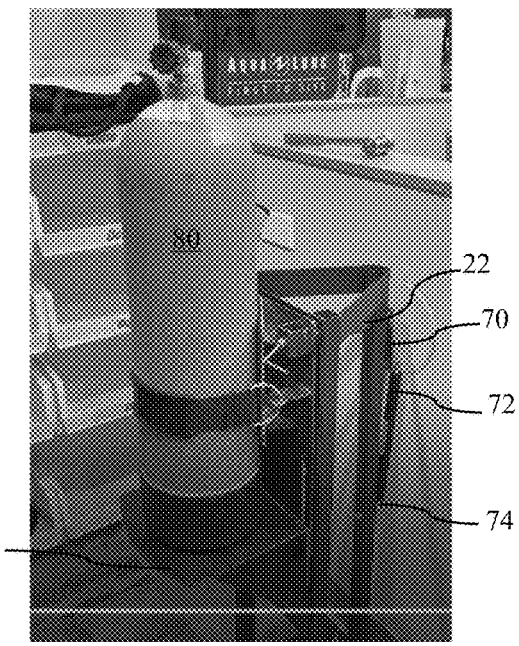

As the rotating plate 20 and, therefore, the compressed gas tank or cylinder 80, rotates, the rod 74 of the hydraulic or pneumatic cylinder 72 may extend, as shown in FIG. 4E until the compressed gas tank or cylinder 80 is completely upside down (i.e., rotated 180 degrees), as illustrated in FIG. 4F, and the rod 74 is fully extended. As the rotating plate 20 continues its rotation past 180 degrees (or even if rotated from 180 degrees back to 0 degrees in the opposite direction), the rod 74 may close or contract within the cylinder 72 thereby dampening and slowing the rotation of the rotating plate 20 and, therefore, the compressed gas tank or cylinder 80, until the rotating plate 20 is back in its initial position (at 0 degrees or 360 degrees, as the case may be), as shown in FIG. 4H. The spring-loaded pin 60 may engage an aperture and further maintain the rotating plate 20 in its initial position.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A compressed gas tank rotating apparatus comprising:
   a base;
   a leg extending upwardly from the base;
   a rotating plate attached to an axle extending through the leg; and
   a holding bracket and a securing strap on the rotating plate configured to securely hold a compressed gas tank on the holding bracket, wherein when the compressed gas tank is disposed on the holding bracket and secured via the securing strap, the compressed gas tank is configured to be disposed between an upside-down configuration and a right-side-up configuration via rotation of the rotating plate,
   wherein the axle is attached to a rotating arm that is further connected to a rod extending from a cylinder tube of a pneumatic or hydraulic cylinder, wherein rotation of the rotating plate causes the rotating arm to rotate and the rod to extend from or retract into the cylinder tube of the pneumatic or hydraulic cylinder, wherein when the compressed gas tank is rotated from the upside-down configuration to the right-side up configuration, the rod retracts into the cylinder tube of the pneumatic or hydraulic cylinder thereby dampening the speed of rotation of the rotating plate and the compressed gas tank.

2. The compressed gas tank rotating apparatus of claim 1 wherein the base is configured to be securely held to a floor.

3. The compressed gas tank rotating apparatus of claim 1 wherein the pneumatic or hydraulic cylinder is fixed to the leg on an end of the cylinder tube opposite an end where the rod extends from or retracts into the cylinder tube.

4. The compressed gas tank rotating apparatus of claim 1 wherein the pneumatic or hydraulic cylinder is rotatably fixed to a point on the leg at the end of the cylinder tube opposite the end where the rod extends from or retracts into the cylinder tube such that when the rotating arm rotates, the pneumatic or hydraulic cylinder swivels about the point on the base.

5. The compressed gas tank rotating apparatus of claim 1 wherein the holding bracket comprises a V-shaped body that is configured to hold the compressed gas tank adjacent the V-shaped body.

6. The compressed gas tank rotating apparatus of claim 1 wherein the holding bracket comprises an elastomeric material on a surface that is configured to contact the compressed gas tank.

7. The compressed gas tank rotating apparatus of claim 1 wherein the securing strap is a ratcheting strap.

8. The compressed gas tank rotating apparatus of claim 1 further comprising:
   a shelf disposed adjacent the rotating plate, the shelf configured to hold a bottom of the compressed gas tank.

9. The compressed gas tank rotating apparatus of claim 1 further comprising:
   at least one leg extending from the rotating plate wherein the shelf is attached to the at least one leg wherein a vertical position of the shelf is adjustable along the at least one leg.

10. The compressed gas tank rotating apparatus of claim 1 further comprising:
    a locking pin configured to engage the rotating plate or the axle for locking the position of the rotating pin or axle in at least one rotational position.

11. A method of using a compressed gas tank rotating apparatus comprising the steps of:
    providing a compressed gas tank rotating apparatus comprising a base, a rotating plate attached to an axle extending through the base, a holding bracket and a securing strap on the rotating plate configured to securely hold a compressed gas tank on the holding bracket wherein when the compressed gas tank is disposed on the holding bracket and secured via the securing strap it is configured to be disposed between a vertical position and a position other than the vertical position via rotation of the rotating plate, wherein the axle is attached to a rotating arm that is further connected to a rod extending from a cylinder tube of a pneumatic or hydraulic cylinder, wherein rotation of the rotating plate causes the rotating arm to rotate and the rod to extend from or retract into the cylinder tube of the pneumatic or hydraulic cylinder securely holding the compressed gas tank on the holding bracket with the securing strap so that the compressed gas tank is in the vertical position;
    rotating the compressed gas tank to the position other than the vertical position; and
    rotating the compressed gas tank back to the vertical position thereby causing the rod to retract into the cylinder tube of the pneumatic or hydraulic cylinder thereby dampening the speed of rotation of the rotating plate and the compressed gas tank.

12. The method of claim 11 further comprising the step of:
    securely fastening the base to a floor.

13. The method of claim 11 wherein the pneumatic or hydraulic cylinder is fixed to the base on an end of the cylinder tube opposite an end where the rod extends from or retracts into the cylinder tube.

14. The method of claim 11 wherein the pneumatic or hydraulic cylinder is rotatably fixed to a point on the base at the end of the cylinder tube opposite the end where the rod extends from or retracts into the cylinder tube such that when the rotating arm rotates, the pneumatic or hydraulic cylinder swivels about the point on the base.

15. The method of claim 11 wherein the holding bracket comprises a V-shaped body and further comprising the step of:
    holding the compressed gas tank adjacent the V-shaped body.

16. The method of claim 11 wherein the holding bracket comprises an elastomeric material on a surface that is configured to contact the compressed gas tank, further comprising the step of:
    contacting the compressed gas tank to the elastomeric material.

17. The method of claim 11 wherein the securing strap is a ratcheting strap and further comprising the step of:

securely holding the compressed gas tank on the holding bracket via the ratcheting strap.

18. The method of claim 11 wherein the compressed gas tank rotating apparatus further comprises a shelf disposed adjacent the rotating plate and further comprising the step of:
  holding a bottom of the compressed gas tank on the shelf.

19. The method of claim 11 wherein the compressed gas tank rotating apparatus further comprises at least one leg extending from the rotating plate wherein the shelf is attached to the at least one leg wherein a position of the shelf is adjustable along a length of the at least one leg wherein adjusting the shelf along the length of the at least one leg causes the shelf to move toward or away from the rotating plate, further comprising the step of:
  adjusting the shelf along the length of the at least one leg to move the shelf toward or away from the rotating plate.

20. The method of claim 11 further comprising the steps of:
  providing a locking pin configured to engage the rotating plate or the axle for locking the position of the rotating pin or axle in at least one rotational position;
  rotating the rotating plate to a rotational position; and
  locking the rotating plate to the rotational position.

* * * * *